United States Patent
Sasaki

[19]

[11] Patent Number: 6,127,897
[45] Date of Patent: Oct. 3, 2000

[54] ZERO-CROSSING DETECTION TYPE CLOCK RECOVERY CIRCUIT OPERATED AT SYMBOL RATE

[75] Inventor: Eisaku Sasaki, Tokyo, Japan

[73] Assignee: NEC Corporation, Tokyo, Japan

[21] Appl. No.: 09/362,491

[22] Filed: Jul. 28, 1999

[30] Foreign Application Priority Data

Jul. 30, 1998 [JP] Japan ................................. 10-215724

[51] Int. Cl.[7] ..................................................... H03D 3/00
[52] U.S. Cl. ............................. 331/25; 331/1 A; 329/304
[58] Field of Search ..................... 331/25, 1 A; 329/304, 329/305, 306, 307, 308, 309, 310; 375/327, 328, 344, 376, 261

[56] References Cited

U.S. PATENT DOCUMENTS

| | | | |
|---|---|---|---|
| 5,042,052 | 8/1991 | Roberts et al. ............................ | 375/97 |
| 5,608,764 | 3/1997 | Sugita et al. ............................. | 375/344 |
| 5,789,988 | 8/1998 | Sasaki . | |

FOREIGN PATENT DOCUMENTS 9-247229  9/1997  Japan .

*Primary Examiner*—Robert Pascal
*Assistant Examiner*—Henry Choe
*Attorney, Agent, or Firm*—Hutchins, Wheeler & Dittmar

[57] ABSTRACT

In a clock recovery circuit in a demodulator of a multi-level quadrature amplitude modulation (QAM) system, an analog/digital (A/D) converter performs an A/D conversion upon an analog baseband signal in synchronization with a sampling clock signal having a time period that is a symbol time period. A phase detector receives successive first and third data sampled from the A/D converter, calculates second data by addition of the first and third data, determines whether or not a signal transition formed by the first and third data crosses a zero value within a predetermined deviation, and compares a polarity of the second data with a polarity of one of the first and third data, and generates a comparison result as a phase detection signal when the signal transition crosses the zero value. A loop filter passes a low-frequency component of the phase detection signal therethrough. A voltage controlled oscillator supplies the sampling clock signal to the A/D converter in accordance with an output signal of the loop filter.

14 Claims, 13 Drawing Sheets

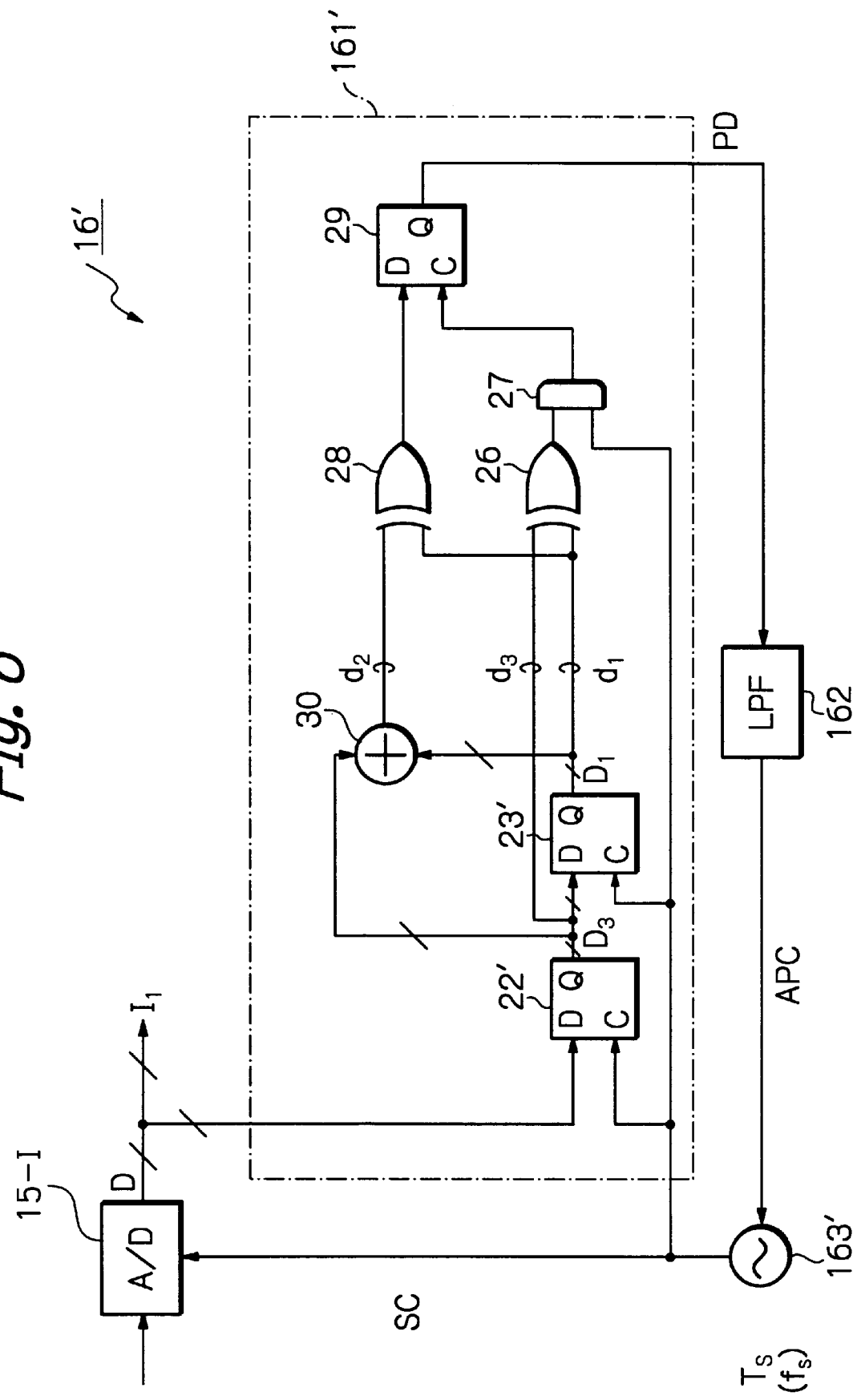

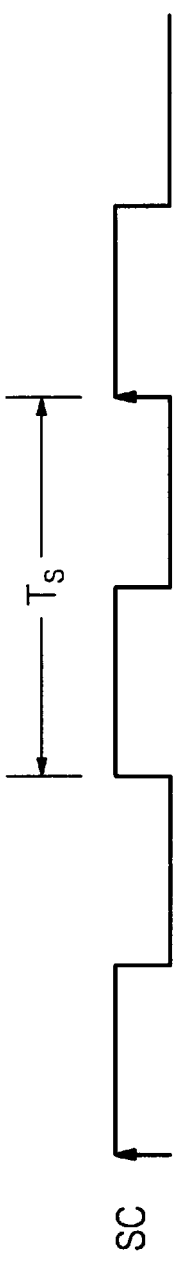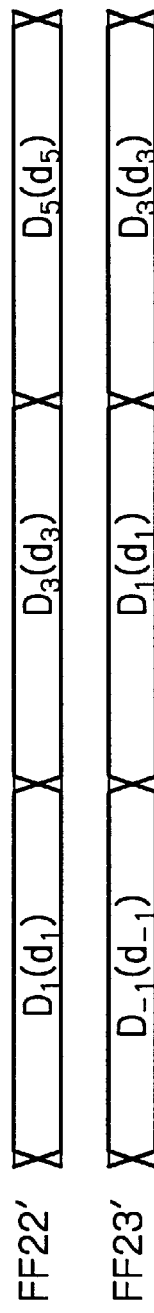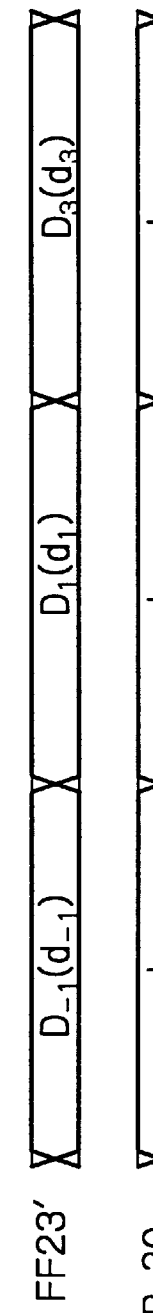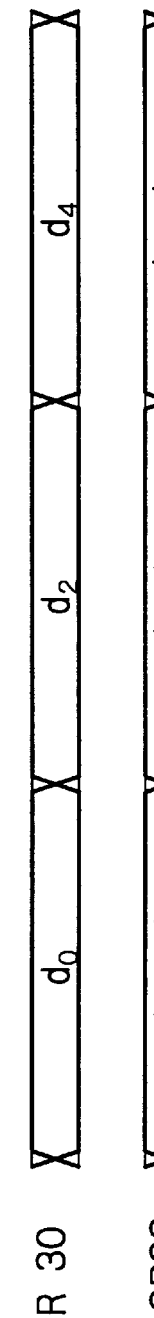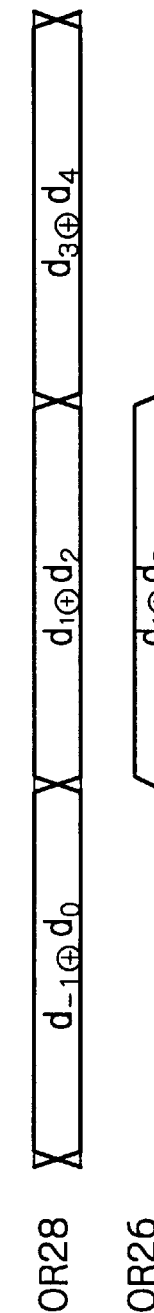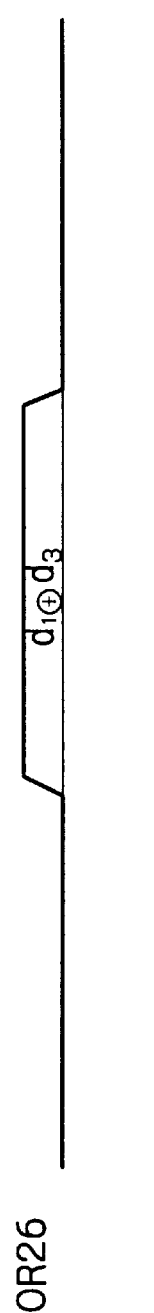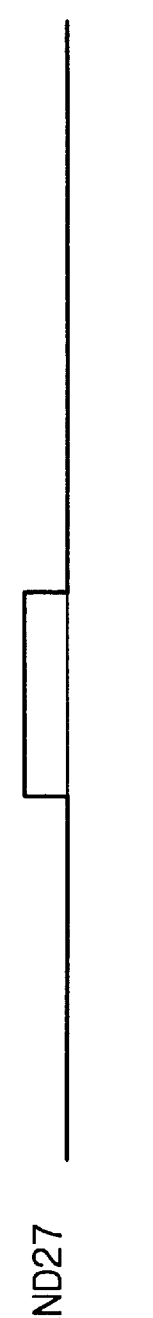

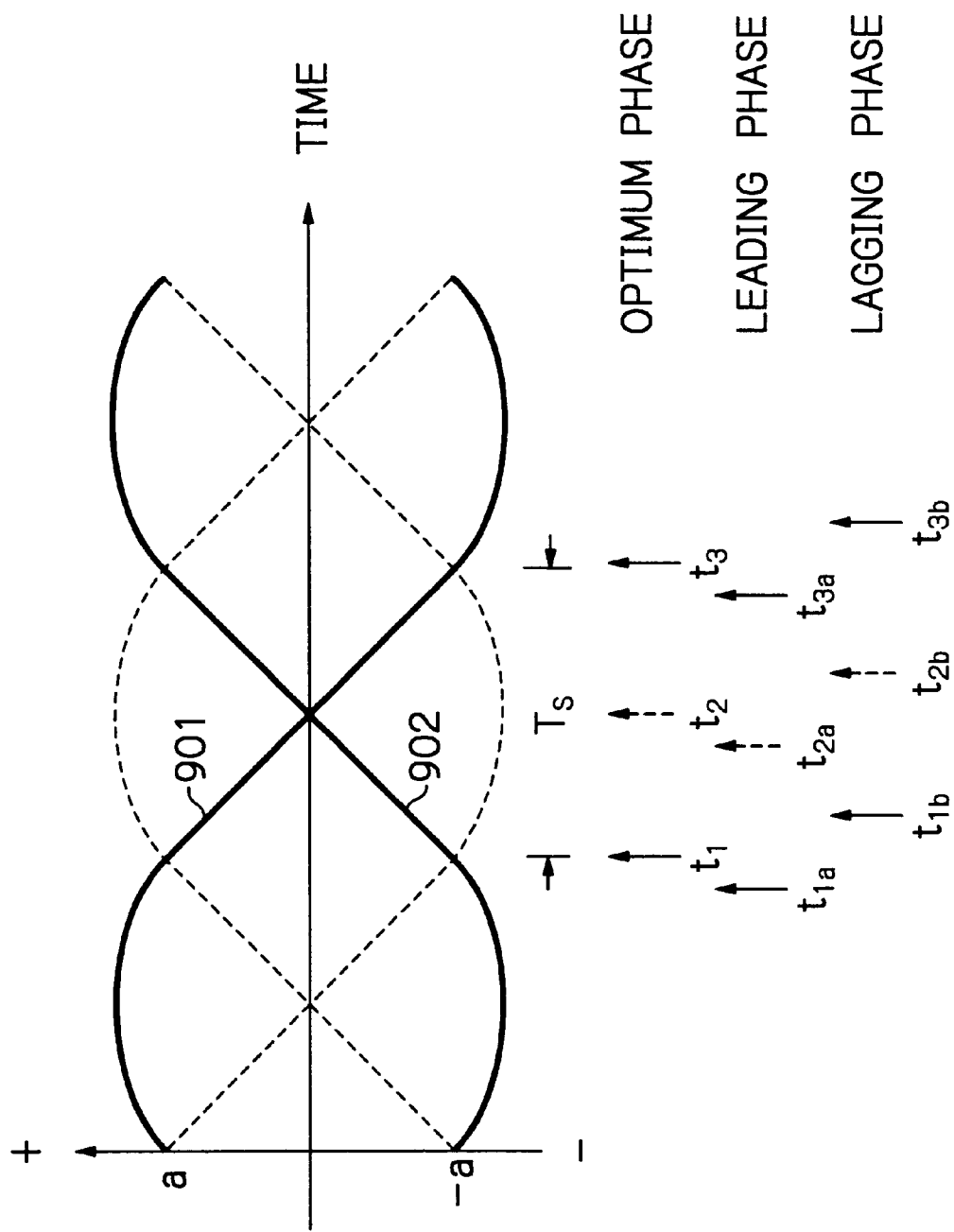

ZERO-CROSSING DETECTION TYPE CLOCK RECOVERY CIRCUIT OPERATED AT SYMBOL RATE

BACKGROUND OF THE INVENTION

1. Field of the Invention

The present invention relates to a clock recovery circuit for a quadrature amplitude modulation (QAM) demodulator in a digital microwave communication system.

2. Description of the Related Art

In a demodulator of a digital microwave communication system, a clock signal is recovered from a received signal, and the received signal is sampled by using the recovered clock signal to obtain digital data.

In a prior art clock recovery circuit (see JP-A-9-247229 & U.S. Pat. No. 5,789,988), an analog/digital (A/D) converter performs an A/D conversion upon a baseband analog signal in synchronization with a sampling clock signal having a time period half of a symbol time period. A phase detector receives successive first, second and third sampled data from the A/D converter, determines whether or not a signal transition formed by the first and third sampled data crosses a zero value within a predetermined time deviation, and compares a polarity of the second sampled data with a polarity of one of the first and third sampled data to generate a phase detection signal when the signal transition crosses the zero value. Further, a loop filter is connected to an output of the phase detector, and a voltage controlled oscillator supplies the sampling clock signal to the A/D converter in accordance with an output signal of the loop filter. This will be explained later in detail.

In the above-described prior art clock recovery circuit, however, since the A/D converter is operated by using the sampling clock signal having a time period half of the symbol clock signal, i.e., a frequency twice the modulation frequency, the operational speed of the A/D converter has to be increased, which increases the power consumption and the manufacturing cost.

SUMMARY OF THE INVENTION

It is an object of the present invention to provide a clock recovery circuit for a multi-level QAM demodulator which has a low power consumption and a low manufacturing cost.

According to the present invention, in a clock recovery circuit in a demodulator of a multi-level QAM system, an A/D converter performs an A/D conversion upon an analog baseband signal in synchronization with a sampling clock signal having a time period that is a symbol time period. A phase detector receives successive first and third data sampled from the A/D converter, calculates second data by addition of the first and third data, determines whether or not a signal transition formed by the first and third data crosses a zero value within a predetermined deviation, and compares a polarity of the second data with a polarity of one of the first and third data, and generates a comparison result as a phase detection signal when the signal transition crosses the zero value. A loop filter passes a low-frequency component of the phase detection signal therethrough. A voltage controlled oscillator supplies the sampling clock signal to the A/D converter in accordance with an output signal of the loop filter.

BRIEF DESCRIPTION OF THE DRAWINGS

The present invention will be more clearly understood from the description set forth below, as compared with the prior art, with reference to the accompanying drawings, wherein:

FIG. 6 is a circuit diagram of the clock recovery circuit of FIG. 5;

FIGS. 8A through 8H are timing diagrams for explaining the operation of the clock recovery circuit of FIG. 6;

FIG. 9 is a timing diagram showing an eye pattern in a 4-level QAM system for explaining the operation of the phase detector of FIG. 6;

DESCRIPTION OF THE PREFERRED EMBODIMENTS

Before the description of the preferred embodiments, a prior art clock recovery circuit will be explained with reference to FIGS. 1, 2, 3A through 3K and 4 (see JP-A-9-247229 & U.S. Pat. No. 5,789,988).

Figure 1:
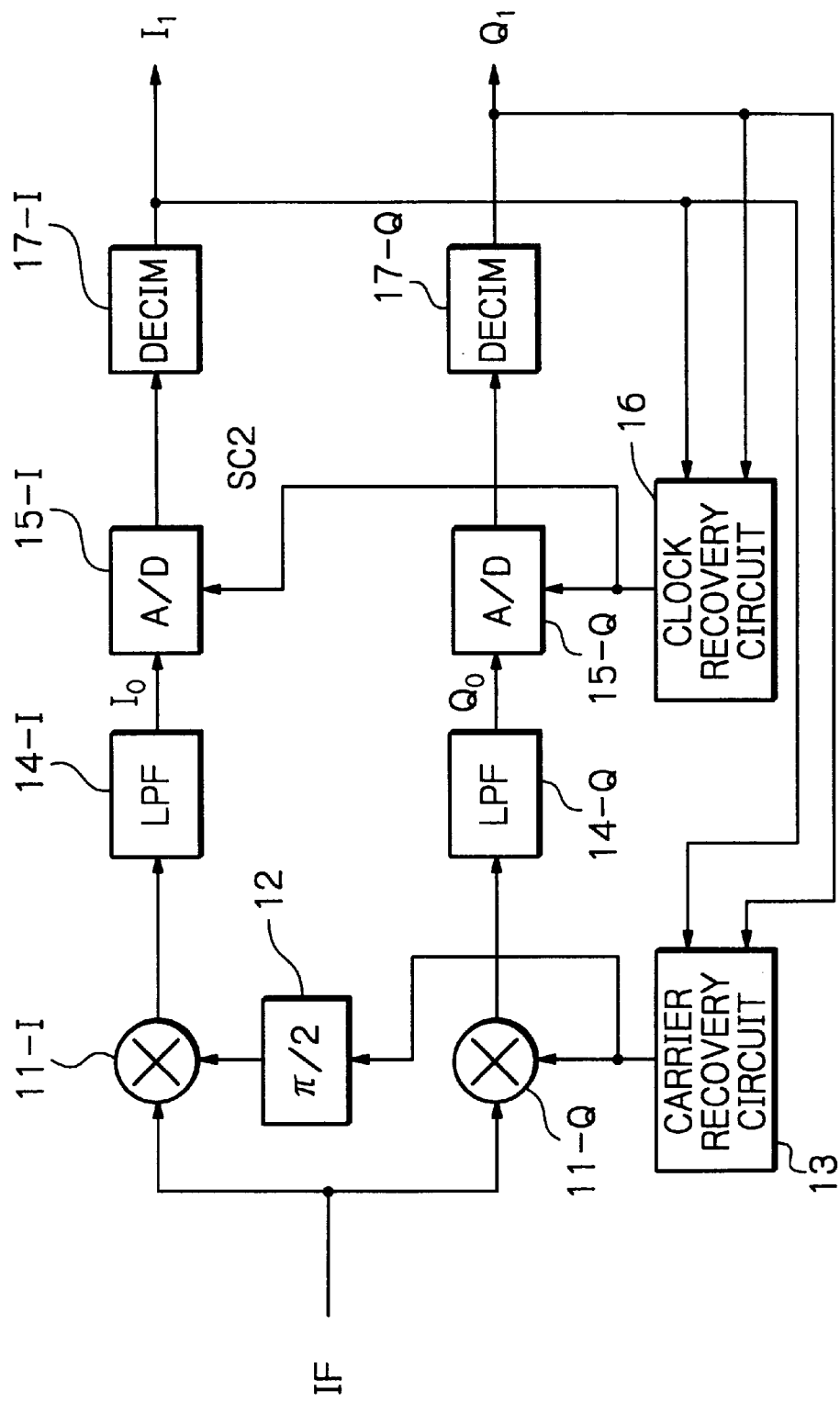
FIG. 1 is a block circuit diagram illustrating a prior art QAM demodulator.

In FIG. 1, which illustrates a prior art QAM demodulator, an intermediate frequency (IF) is supplied from a receiver (not shown) to analog multipliers 11-I and 11-Q. The analog multiplier 11-I multiplies the IF signal by a $\pi/2$-shifted carrier wave signal from a $\pi/2$ phase shifter 12 which also receives a carrier wave signal from a carrier recovery circuit 13. Similarly, the analog multiplier 11-Q multiplies the IF signal by the carrier wave signal from the carrier recovery circuit 13.

A low frequency component of the output signal of the analog multiplier 11-I passes through a low-pass filter 14-I with a roll-off filtering function, to thereby generate a coherent analog baseband signal $I_0$. Similarly, a low frequency component of the output signal of the analog multiplier 11-Q passes through a low-pass filter 14-Q with a roll-off filtering function, to thereby generate a coherent analog baseband signal $Q_0$. Analog/digital (A/D) converters 15-I and 15-Q perform analog/digital conversions upon the analog baseband signals $I_0$ and $Q_0$, respectively, by using a sampling clock signal SC2 having a time period that is half of a symbol time period $T_S$. In other words, the frequency of the sampling clock signal SC2 is twice that of a modulation frequency $f_S$. The sampling clock signal SC2 is generated from a clock recovery circuit 19.

Thus, an in-phase (I)-component digital signal $I_1$, is generated from the A/D converter 15-I via an elimination (decimation) circuit 17-I, while a quadrature (Q) component digital signal $Q_1$ is generated from the A/D converter 15-Q via an elimination (decimation) circuit 17-Q.

The I-component digital signal $I_1$ and the Q-component digital signal $Q_1$ are supplied to the carrier recovery circuit 13 and the clock recovery circuit 16.

The clock recovery circuit 16 of FIG. 1 uses a zero-crossing detecting method where error information at a center sampling phase where the baseband signal crosses zero value is extracted and a phase locked loop is formed by this error information.

Figure 2:
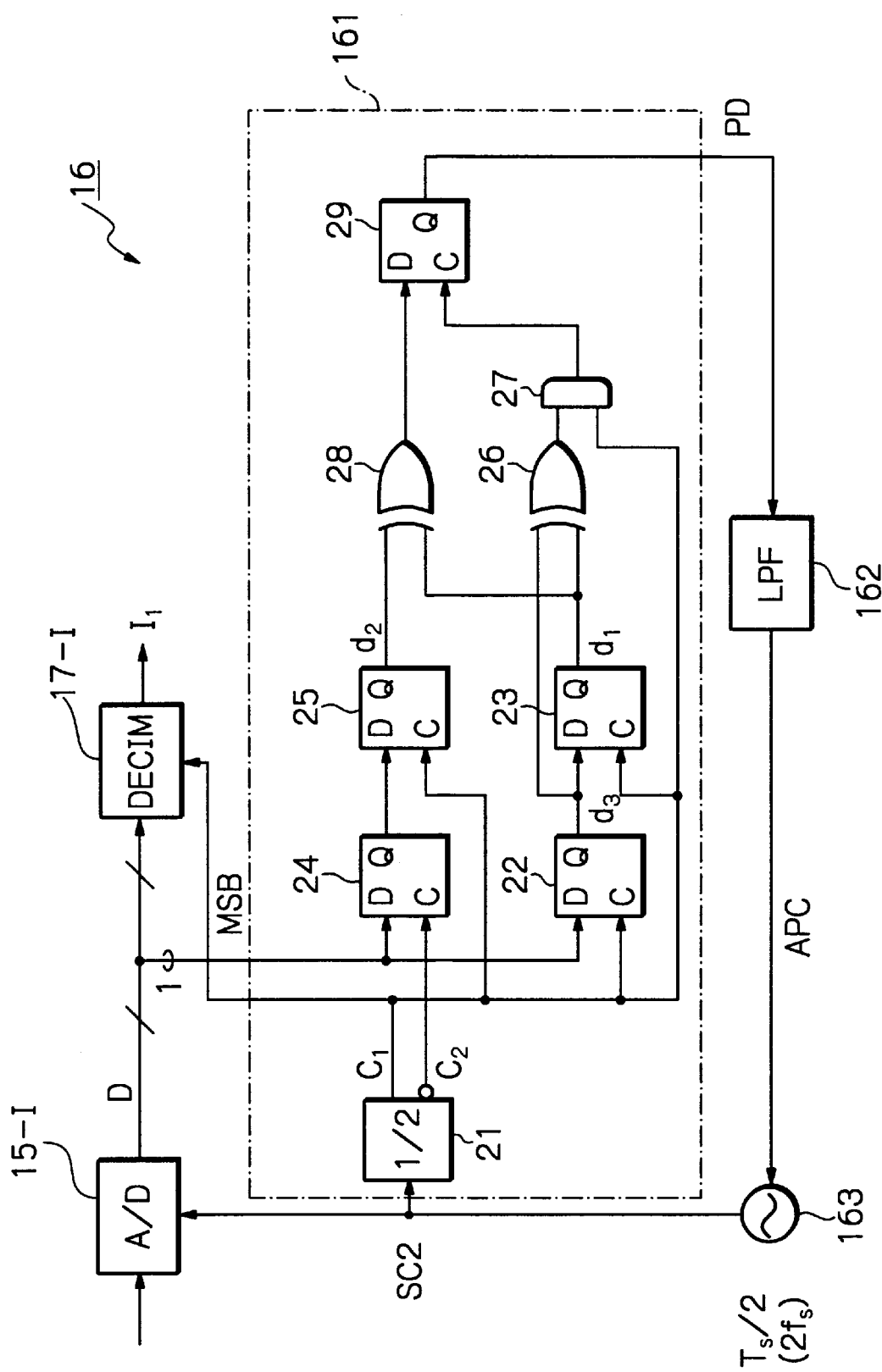
FIG. 2 is a detailed circuit diagram of the phase detector of FIG. 1.

In FIG. 2, which is a detailed circuit diagram of the clock recovery circuit 16 of FIG. 1, since the I-component digital signal $I_1$ and the Q-component digital signal $Q_1$ are othogonally arranged and equivalent, the sampling clock signal SC2 can be obtained from one of the I-component digital signal $I_1$ and the Q-component digital signal $Q_1$. Therefore, only the A/D converter 15-I is illustrated; however, it goes without saying that the output of the A/D converter A/D 15-Q can be connected to the clock recovery circuit 16.

The clock recovery circuit 16 is constructed by a phase detector 161 for receiving only a most significant bit (MSB) of the A/D converter 15-I to generate a phase detection signal PD, a low-pass filter 162 for passing a low-frequency component of the phase detection signal PD to generate an automatic phase control signal APC, and a voltage controlled oscillator 163 for receiving the automatic phase control signal APC to generate the sampling clock signal SC2 whose frequency is 2 $f_S$.

The phase detector 161 of FIG. 2 is further explained below in detail with reference to FIGS. 3A through 3K.

Figure 3:
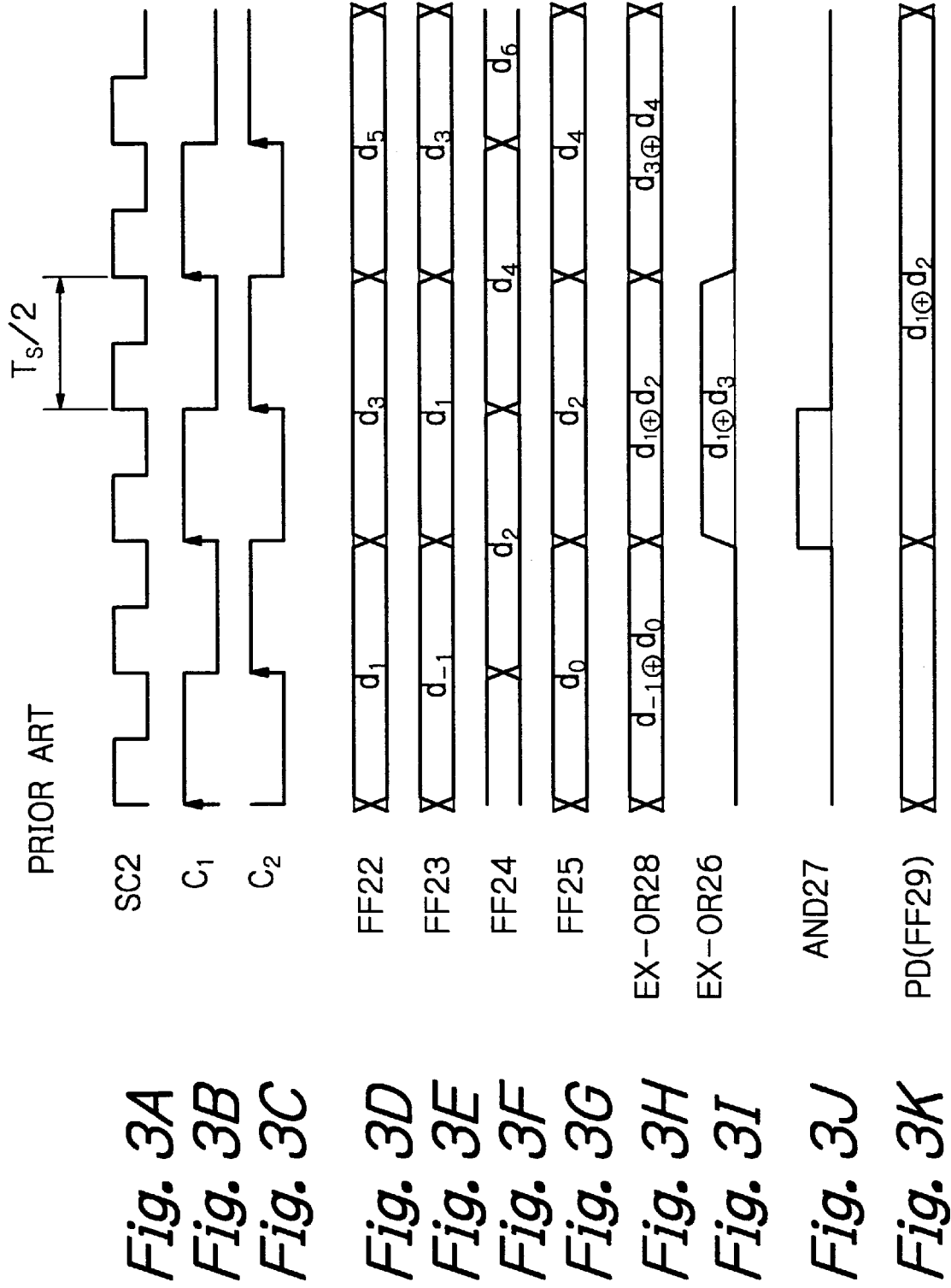
FIGS. 3A through 3K are timing diagram for explaining the operation of the phase detector of FIG. 2.

A ½ frequency divider 21 receives the sampling clock signal SC2 as shown in FIG. 3A outputted from the voltage controlled oscillator 163 to generate a positive-phase clock signal $C_1$ and a negative-phase clock signal $C_2$ as shown in FIGS. 3B and 3C. The clock signals $C_1$ and $C_2$ have a time period $T_S$.

Two flip-flops 22 and 23 and two flip-flops 24 and 25 form shift registers for delaying the MSB of the output signal of the A/D converter 15-I. The flip-flops 22, 23 and 25 are operated by clock signal $C_1$ and the flip-flop 24 is operated by the clock signal $C_2$. As a result, the output signals of the flip-flops 22, 23, 24 and 25 are changed as shown in FIGS. 3D, 3E, 3F and 3G, respectively. Note that the outputs of the flip-flops 23, 25 and 22 correspond to the polarities of first sampling data $D_1$, second sampling data $D_2$ and third sampling data $D_3$, respectively, of the output signal of the A/D converter 15-I.

An exclusive OR circuit 26 compares the output of the flip-flop 22 with that of the flip-flop 23. Only when the polarity of the first sampled data $D_1$ is opposite to the polarity of the third sampled data $D_3$, is the output signal of the exclusive OR circuit 26 "H". Otherwise, the output of the exclusive OR circuit 26 is "L".

As shown in FIG. 3H, the output signal of the exclusive OR circuit 28 is changed at every time period $T_S$. Here, assume that the output signal of the exclusive OR circuit 26 is changed as shown in FIG. 3I. The output signal of the exclusive OR circuit 26 is made effective by an AND circuit 27.

An exclusive OR circuit 28 compares the output signal of the flip-flop 23 with that of the flip-flop 25. That is, the polarity of the first data $D_1$ is compared with that of the second data $D_2$. When the polarity of the first data $D_1$ is the same as that of the second data $D_2$, the output signal of the exclusive OR circuit 28 is "L". On the other hand, when the polarity of the first data $D_1$ is different from that of the second data $D_2$, the output signal of the exclusive OR circuit 28 is "H". The output signal of the exclusive OR circuit 28 is shown in FIG. 3H.

As shown in FIGS. 3I, 3J and 3K, the output signal of the exclusive OR circuit 28 is latched in a flip-flop 29 in synchronization with the output signal of the AND circuit 27.

The algorithm of the operation of the phase detector 161 of FIG. 2 is as follows. Assume that three successive sampled digital data at the output of the A/D converter 15-I are denoted by $D_1$, $D_2$ and $D_3$. In this case, only if the data $D_1$ has an inverted relationship to the data $D_3$, is an exclusive OR logic signal between the polarity of the data $D_1$ and the polarity of the data $D_2$ calculated and supplied to the loop filter 162. The exclusive OR logic signal serves as the phase detection signal PD for showing whether the sampling timing is leading or lagging an optimum phase.

Figure 4:
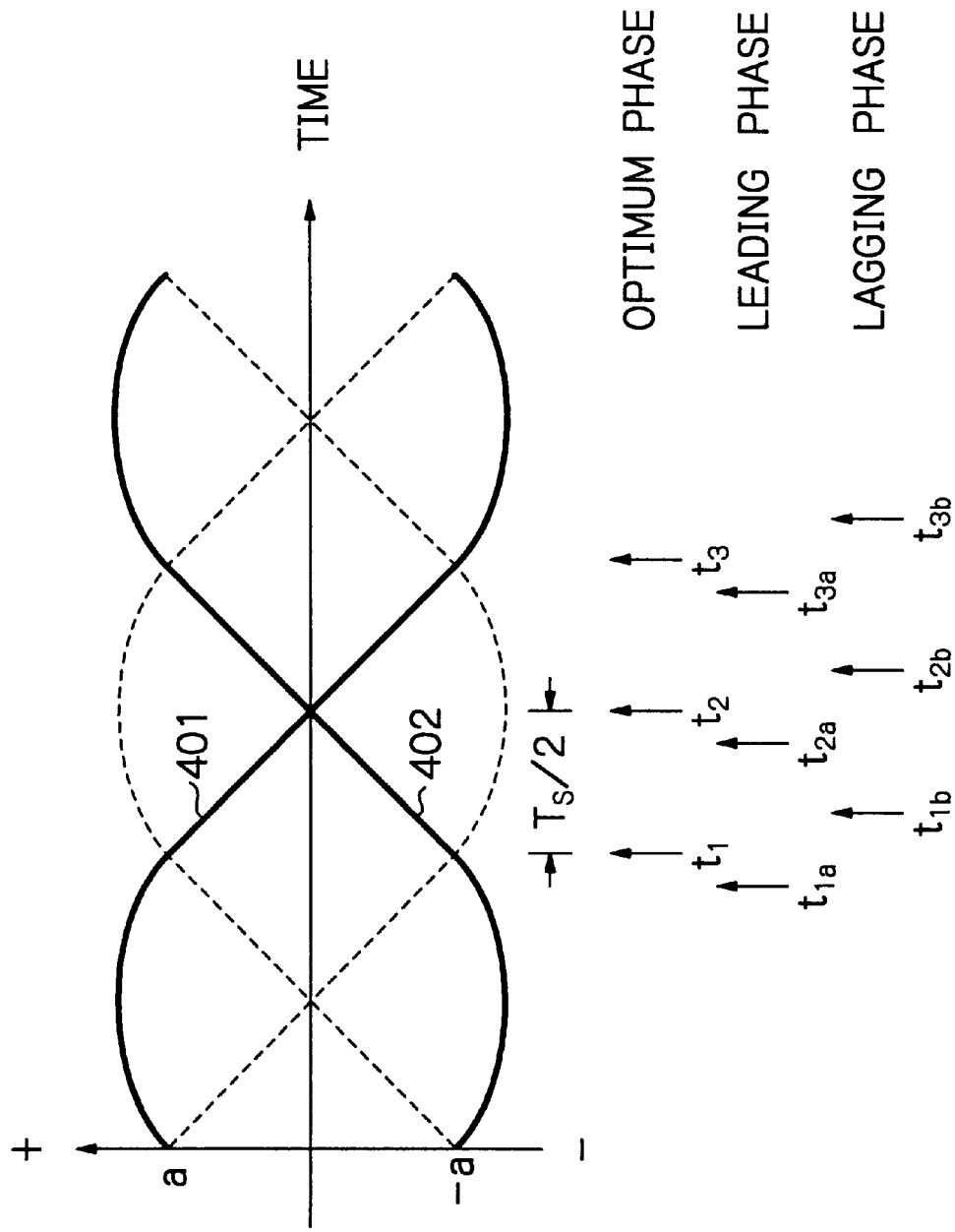
FIG. 4 is a timing diagram showing an eye pattern in a 4-level QAM system for explaining the operation of the phase detector of FIG. 2.

In FIG. 4, which shows an eye pattern in a 4-level QAM system, an abscissa designates a time and an ordinate designates an amplitude (voltage) of the output signal of the A/D converter 15-I. The polarity of the signal or the polarity of the data is determined by whether the voltage of the signal, i.e., the MSB of the data is "0" or "1". Also, in FIG. 4, $t_1$, $t_2$, $t_3$, $t_{1a}$, $t_{2a}$, $t_{3a}$, $t_{1b}$, $t_{2b}$ and $t_{3b}$ denote sampling timings for the A/D converter 15-I. Here, the sampling timings $t_1$, $t_2$ and $t_3$ are optimum timings, the sampling timings $t_{1a}$, $t_{2a}$ and $t_{3a}$ are leading timings, and the sampling timings $t_{1b}$, $t_{2b}$ and $t_{3b}$ are lagging timings. At every symbol time period $T_S$, the eye pattern of the signal transitions is converged into two points defined by voltages −a and +a which correspond to data "0" and "1", respectively. In this case, there are 4 possible signal transitions from time $t_1$ ($t_{1a}$, $t_{1r}$) to time $t_3$ ($t_{3a}$, $t_{3r}$). Among the 4 signal transitions, two signal transitions 401 and 402 cross 0v (center voltage) at time $t_2$ ($t_{2a}$, $t_{2b}$). Therefore, only the two signal transitions 401 and 402 are extracted from all the 4 possible signal transitions, to form the phase detection signal PD. Since the time deviation for obtaining phase information by timing $t_2$ ($t_{2a}$, $t_{2b}$) is very small, the fluctuation of the phase detection signal PD can be remarkably reduced. Thus, a jitter-suppressed clock signal can be obtained without narrowing the bandwidth of the loop filter 162.

The signal transitions 401 and 402 satisfy the condition that the data $D_1$ sampled at a first timing $t_1$, $t_{1a}$ or $t_{1b}$ has a reverse relationship to the data $D_3$ sampled at a third timing $t_3$, $t_{3a}$ or $t_{3b}$.

As shown in FIG. 4, if the input signal of the A/D converter 15-I is sampled at the optimum timings $t_1$, $t_2$ and $t_3$, the mark ratio of "H" to "L" in the polarity of data is 1.

As shown in FIG. 4, if the input signal of the A/D converter 15-I is sampled at the leading timings $t_{1a}$, $t_2$ and $t_{3a}$, the polarity of the data $D_2$ at the second timing $t_{2a}$ is the same as the polarity of the data $D_1$ at the first timing $t_{1a}$ for the signal transitions 401 and 402. As a result, an exclusive OR logic between the polarity of the data $D_1$ and the polarity of the data $D_2$ is "L" for the two signal transitions 401 and 402.

Also, as shown in FIG. 4, if the input signal of the A/D converter 15-I is sampled at the lagging timings $t_{1b}$, $t_{2b}$ and $t_{3b}$, the polarity of the data $D_2$ at the second timing $t_{2a}$ is opposite to the polarity of the data $D_1$ at the first timing $t_{1a}$ for the signal transitions 401 and 402. As a result, an exclusive OR logic between the polarity of the data $D_1$ and the polarity of the data $D_2$ is "H" for all the signal transitions 401 and 402.

Thus, the above-mentioned exclusive OR logic represents phase information of the sampling clock signal SC2 and therefore, this phase information is supplied to the loop filter 162, thus creating an APC voltage for the voltage controlled oscillator 163.

Note that, since the positive-phase clock signal $C_1$, always corresponds to an opening center of each eye pattern, the output data D of the A/D converter 15-I at a zero cross point of each eye pattern is eliminated in the elimination circuit 17-I which is operated by the positive-phase clock signal $C_1$.

The clock recovery circuit 16 of FIG. 1 is operated at a high carrier to noise (C/N) ratio; however, the clock recovery circuit 16 can be operated at a low C/N ratio where the analog baseband signal $I_0$ includes a large noise component. Also, the clock recovery circuit 16 can be applied to a higher-level QAM system such as 16-level QAM system, a 32-level QAM system or the like.

In the QAM system of FIG. 1, however, since the A/D converters 15-I and 15-Q are operated by using the sampling clock signal SC2 whose frequency $2f_S$, is twice that of the modulation frequency $f_S$, the operation speed of the A/D converters 15-I and 15-Q as well as the operational speed of the decimation circuits 17-I and 17-Q has to be increased, which increases the power consumption and the manufacturing cost. Also, if a quasi-coherent detection system is adopted, the operation speed of an endless phase shifter for synchronization for carrier waves has to be increased, which also increases the power consumption and the manufacturing cost.

Figure 5:
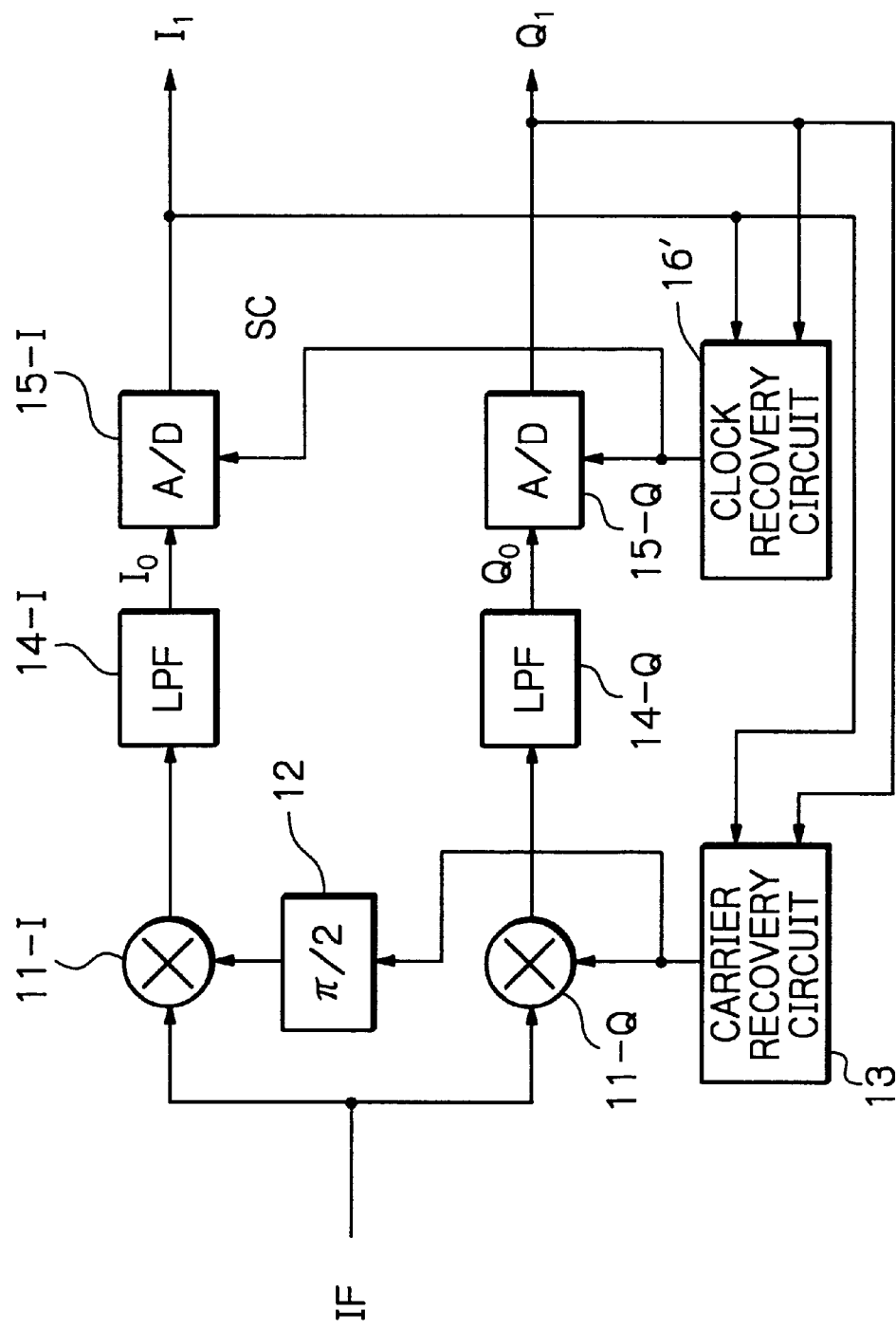
FIG. 5 is a block circuit diagram illustrating a first example of the demodulator to which a first embodiment of the clock recovery circuit according to the present invention is applied.

FIG. 5 is a block circuit diagram illustrating a first example of the demodulator to which a first embodiment of the clock recovery circuit according to the present invention is applied. In FIG. 5, according to the present invention, a clock recovery circuit 16' for generating a sampling clock signal SC having a time period that is the same as the symbol time period $T_S$ is provided instead of the clock recovery circuit 16 of FIG. 1. In this case, the A/D converters 15-I and 15-Q are operated in accordance with the sampling clock signal SC. Also, since the sampling clock signal SC always corresponds to an opening center of each eye pattern, the decimation circuits 17-I and 17-Q of FIG. 1 are not provided.

In FIG. 6, which is a detailed circuit diagram of the clock recovery circuit 16' of FIG. 5, the ½ frequency divider 21 of FIG. 2 is not provided.

Also, flip-flops 22' and 23' are provided instead of the flip-flops 22 and 23, respectively, of FIG. 2. Each of the flip-flops 22' and 23' is operated by the sampling clock signal SC, and therefore, the output data D of the A/D converter 15-I is delayed by one symbol time period $T_S$. Note that each of the flip-flops 22' and 23' is formed by a plurality of flip-flops; however, only one flip-flop is illustrated to simplify the description. The most significant bit of each of the output signals of the flip-flops 22' and 23' are supplied to the exclusive OR circuit 26.

Further, an adder 30 is provided instead of the flip-flops 24 and 25 of FIG. 2. The adder 30 adds the output data of the flip-flop 22' to the output data of the flip-flop 23', and as a result, only the most significant bit of the output data of the adder 30 is supplied to the exclusive OR circuit 28.

Figure 7A:
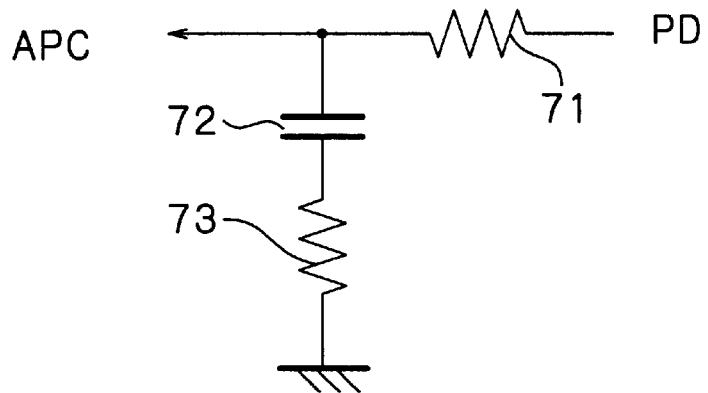
FIGS. 7A and 7B are circuit diagrams of the low-pass filter of FIG. 6.
Figure 7B:
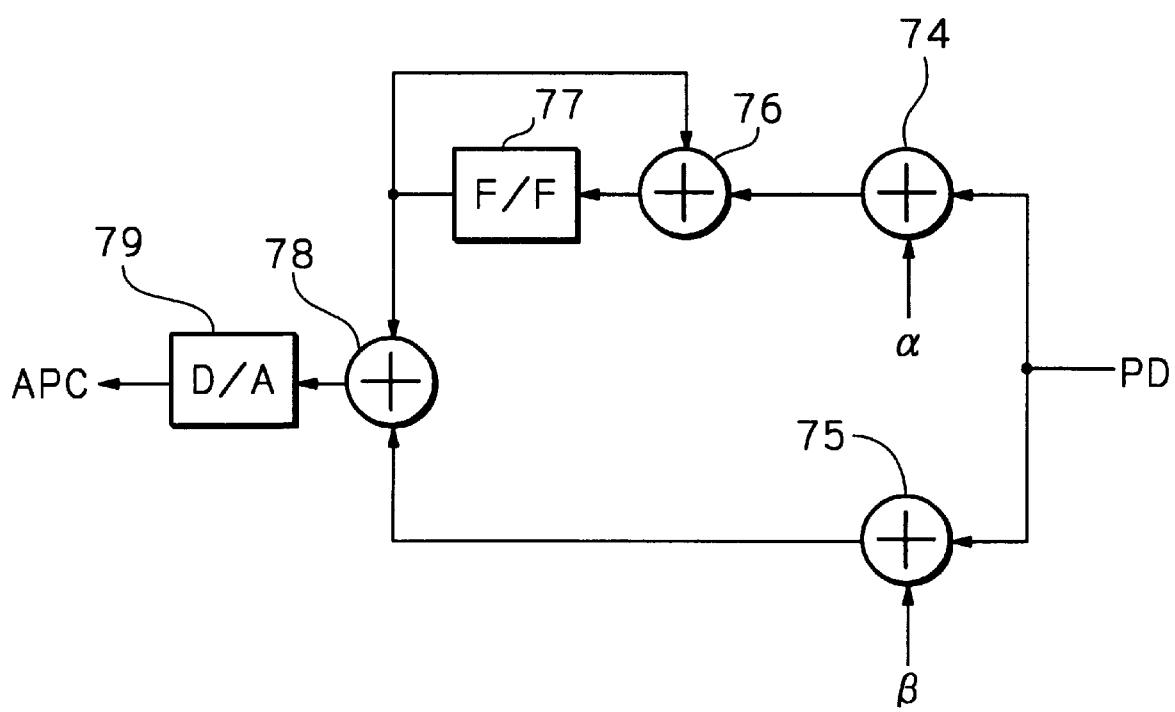

The low-pass filter 162 for suppressing the noise component of the phase detection signal PD can be constructed by an analog circuit as illustrated in FIG. 7A or a digital circuit as illustrated in FIG. 7B. For example, in FIG. 7A, the low-pass filter 162 is constructed by a lag lead filter which includes a resistor 71, a capacitor 72 and a resistor 73. Also, in FIG. 7B, the low-pass filter 162 is constructed by a secondary lag lead filter which includes multipliers 74 and 75 for multiplying the phase detection signal PD by definite values α and β, respectively, an adder 76, a flip-flop 77, an adder 78 and a D/A converter 79. In this case, the adder 76 adds the output signal (=α·PD) of the multiplier 74 to the output signal of the flip-flop 77, so that the addition result of the adder 76 is again stored in the flip-flop 77. The adder 78 adds the output signal (=β·PD) of the multiplier 75 to the output signal of the flip-flop 77. The addition result of the adder 78 is converted by the D/A converter 79 to an analog voltage of the automatic phase control signal APC by

APC=Σα·PD+β·PD

The phase detector 161' of FIG. 6 is further explained below in detail with reference to FIGS. 8A through 8H.

The flip-flops 22' and 23' are operated by the sampling clock signal SC as shown in FIG. 8A, so that the flip-flops 22' and 23' form shift registers for delaying the output data D of the A/D converter 15-I, as shown in FIGS. 8B and 8C, respectively. Note that the output signals of the flip-flops 22' and 23' correspond to first sampling data $D_1$ and third sampling data $D_3$, respectively, of the A/D converter 15-I.

The exclusive OR circuit 26 compares the polarity (MSB) of the output signal of the flip-flop 22' with that of the flip-flop 23'. Only when the polarity of the first sampled data $D_1$ is opposite to the polarity of the third sampled data $D_3$, is the output signal of the exclusive OR circuit 26 "H". Otherwise, the output of the exclusive OR circuit 26 is "L".

The first sampled data $D_1$ and the third sampled data $D_3$ are added by the adder 30 to generate second data $D_2$. Note that the second data $D_2$ is a linear interpolation between the first sampled data $D_1$ and the third sampled data $D_3$. In this case, as shown in FIG. 8D, only the MSB ($d_2$) of the second data $D_2$ is outputted from the adder 30. Therefore, since only the polarity (MSB) of the second data $D_2$ is necessary for the exclusive OR operation of the exclusive OR circuit 28, it is unnecessary to divide the addition result of the adder 30 by 2.

As shown in FIG. 8E, the output signal of the exclusive OR circuit 28 is changed at every time period $T_S$. Here, assume that the output signal of the exclusive OR circuit 26 is changed as shown in FIG. 8F. The output signal of the exclusive OR circuit 26 is made effective by the AND circuit 27.

The exclusive OR circuit 28 compares the polarity (MSB) of the output signal of the flip-flop 23' with that of the adder 30. That is, the polarity of the first data $D_1$ is compared with that of the second data $D_2$. When the polarity of the first data $D_1$ is the same as that of the second data $D_2$, the output signal of the exclusive OR circuit 28 is "L". On the other hand, when the polarity of the first data $D_1$ is different from that of the second data $D_2$, the output signal of the exclusive OR circuit 28 is "H". The output signal of the exclusive OR circuit 28 is shown in FIG. 8E.

As shown in FIGS. 8F, 8G and 8H, the output signal of the exclusive OR circuit 28 is latched in the flip-flop 29 in synchronization with the output signal of the AND circuit 27.

The algorithm of the operation of the phase detector 161 of FIG. 6 is as follows. Assume that two successive sampled digital data at the output of the A/D converter 15-I are denoted by $D_1$ and $D_3$. Sampled data $D_2$ is not sampled from the A/D converter 15-I, but is calculated by using a linear interpolation method between the sampled data $D_1$ and $D_3$. Thus, the sampling clock signal for sampling the data $D_2$ is unnecessary, and accordingly, only the data $D_1$ and $D_3$ are sampled by using the sampling clock signal SC having the same frequency as that of amodulationfrequency. Even in this case, only if the data $D_1$ has an inverted relationship to the data $D_3$, is an exclusive OR logic signal between the polarity of the data $D_1$ and the polarity of the data $D_2$ calculated and supplied to the loop filter 162. The exclusive OR logic signal serves as the phase detection signal PD for showing whether the sampling timing is leading or lagging an optimum phase.

In FIG. 9, which also shows an eye pattern in a 4-level QAM system, an abscissa designates a time and an ordinate designates an amplitude (voltage) of the output signal of the A/D converter 15-I. The polarity of the signal or the polarity of the data is determined by whether the voltage of the signal, i.e., the MSB of the data is "0" or "1". Also, in FIG. 9, $t_1$, $t_3$, $t_{1a}$, $t_{3a}$, $t_{1b}$ and $t_{3b}$ denote sampling timings for the A/D converter 15-I. Here, the sampling timings $t_1$ and $t3$ are optimum timings, the sampling timings $t_{1a}$ and $t_3a$ are leading timings, and the sampling timings $t_{1b}$ and $t_{3b}$ are lagging timings. Also, since signal transitions 901 and 902 are linear rather than curvilinear around the timings $t_2$, $t_{2a}$ and $t_{2b}$, the timings $t_2$, $t_{2a}$ and $t_{2b}$ for the data $D_2$ are also an optimum timing, a leading timing and a lagging timing, respectively. In this case, only the polarity (MSB) of the data $D_2$ is used, and therefore, an error rate of the polarity (MSB) of the data $D_2$ is very low. Further, after the synchronization of the PLL is pulled in, since the sampling timings for the data $D_1$ and $D_3$ are defined to around the optimum timings $t_1$ and $t_3$, respectively, the error rate of the polarity (MSB) of the data $D_2$ has no problem.

If the sampling timings for the data $D_1$ and $D_3$ are $t_1$ and $t_3$ (optimum phase), even when the C/N ratio is small, the polarity of the data $D_2$ is determined. In this case, since the timing for the data $D_2$ is around the zero crossing point, the mark ratio of a positive polarity to a negative polarity of the signal is 50% (APC=0). Also, if the sampling timings for the data $D_1$ and $D_3$ are $t_{1a}$ and $t_{3a}$ (leading phase), even when the C/N ratio is small, the polarity of the data $D_2$ is determined. In this case, the mark ratio is less than 50% (APC<0). Further, if the sampling timings for the data $D_1$ and $D_3$ are $t_{1b}$ and $t_{3b}$ (lagging phase), even when the C/N ratio is small, the polarity of the data $D_2$ is determined. In this case, the mark ratio is more than 50% (APC>0).

Figure 10:
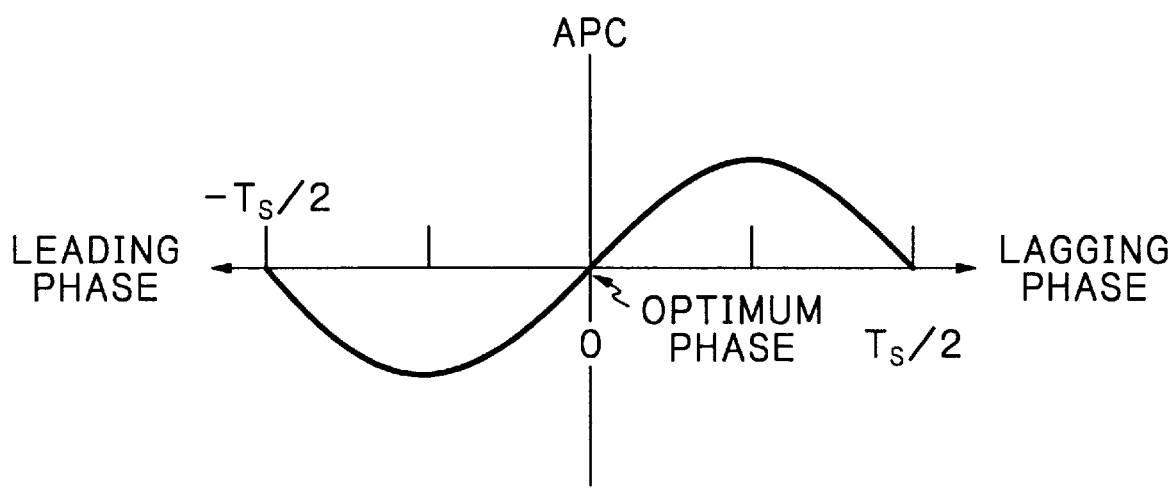
FIG. 10 is a diagram showing the automatic phase control characteristics of the clock recovery circuit of FIG. 6.

Thus, the characteristics between the sampling phase and the automatic phase control voltage APC as shown in FIG. 10 is obtained.

In the same way as in the prior art, since the time deviation for obtaining phase information by timing $t_2$ ($t_{2a}$, $t_{2b}$) is very small, the fluctuation of the phase detection signal PD can be remarkably reduced. Thus, a jitter-suppressed clock signal can be obtained without narrowing the bandwidth of the loop filter 162.

Thus, in the QAM demodulator of FIG. 5, since the A/D converters 15-I and 15-Q are operated at the modulation frequency $f_S$, the power consumption of A/D converters 15-I and 15-Q can be reduced.

Figure 11:
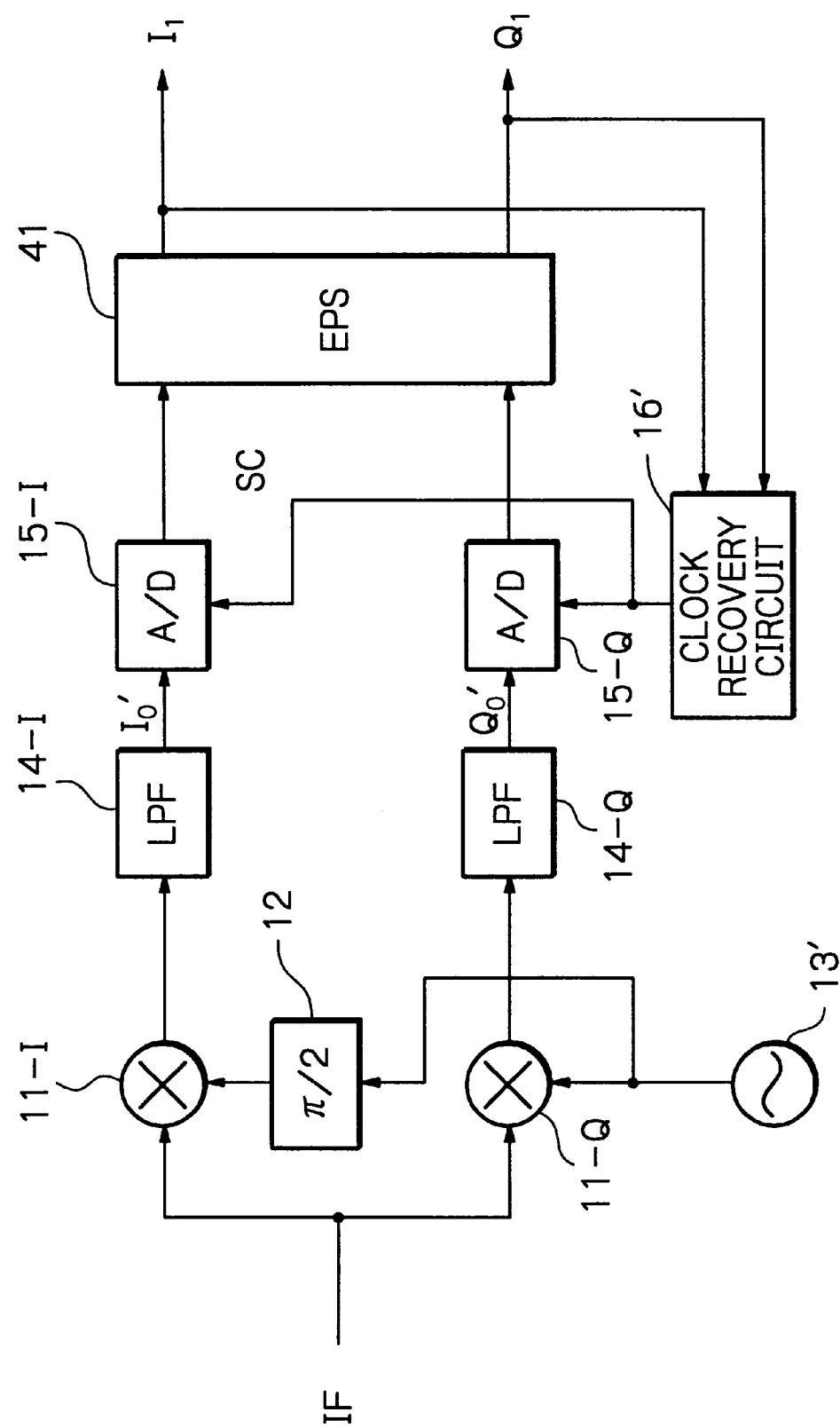
FIG. 11 is a block circuit diagram illustrating a second example of the demodulator to which the first embodiment of the clock recovery circuit of FIG. 6 is applied.

FIG. 11 illustrates a second example of the QAM demodulator to which the clock recovery circuit 16' of FIG. 6 is also applied. In FIG. 11, an oscillator 13' for generating a carrier wave signal is provided instead of the carrier recovery circuit 13 of FIG. 5. In this case, the frequency of the carrier wave signal generated from the oscillator 13' does not coincide with the frequency of a carrier wave included in the IF signal, so that the low-pass filters 14-I and 14-Q generate a quasi-coherent analog baseband signal $I_0'$ and a quasi-coherent analog baseband signal $Q_0'$, respectively. Also, an endless phase shifter 41 is connected to the A/D converters 15-I and 15-Q in order to compensate for the phase offset components included in the output signals of the A/D converters 15-I and 15-Q. In this case, since the clock recovery circuit 16' requires the signals $I_1$ and $Q_1$ at the modulation frequency $f_S$, the endless phase shifter 41 can operate at the modulation frequency $f_S$. Therefore, the power consumption of the endless phase shifter 41 can also be reduced.

Figure 12:
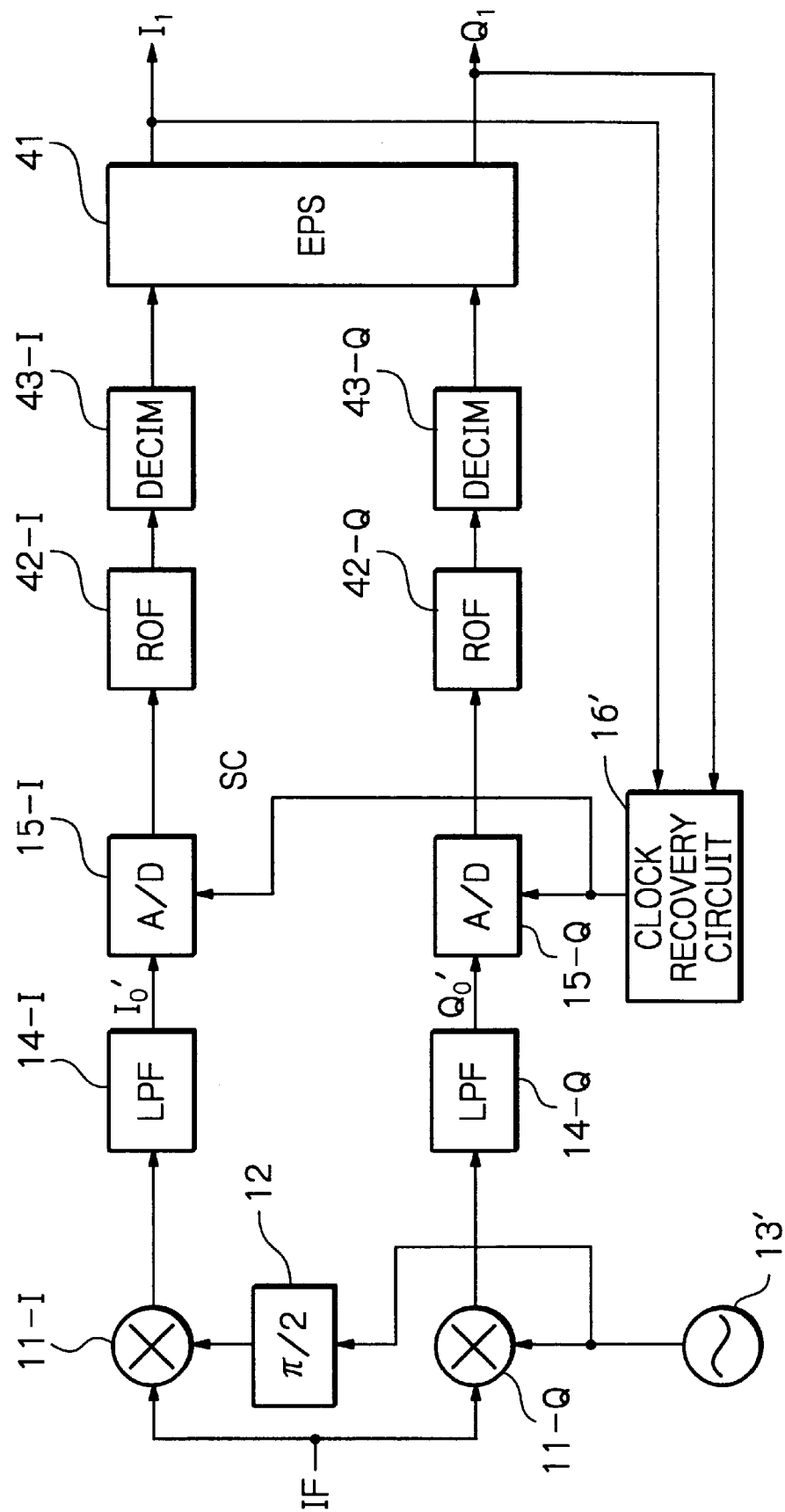
FIG. 12 is a block circuit diagram illustrating a third example of the demodulator to which the first embodiment of the clock recovery circuit of FIG. 6 is applied.

FIG. 12 is a third example of the QAM demodulator to which the clock recovery circuit 16' of FIG. 6 is applied. In FIG. 12, a roll-off filter 42-I and an elimination circuit 43-I are inserted between the A/D converter 15-I and the endless phase shifter 41 of FIG. 11, and a roll-off filter 42-Q and an elimination circuit 43-Q are inserted between the A/D converter 15-Q and the endless phase shifter 41 of FIG. 11. Note that the low-pass filters 14-I and 14-Q of FIG. 12 do not roll-off filtering functions.

In FIG. 12, although the roll-off filters 42-I and 42-Q have to be operated at a speed higher than the speed defined by the modulation frequency $f_S$, the endless phase shifter 41 at the post stages of the elimination circuit 43-I and 43-Q can be operated at the modulation frequency $f_S$, so that the power consumption of the endless phase shifter 41 can be reduced.

Figure 13:
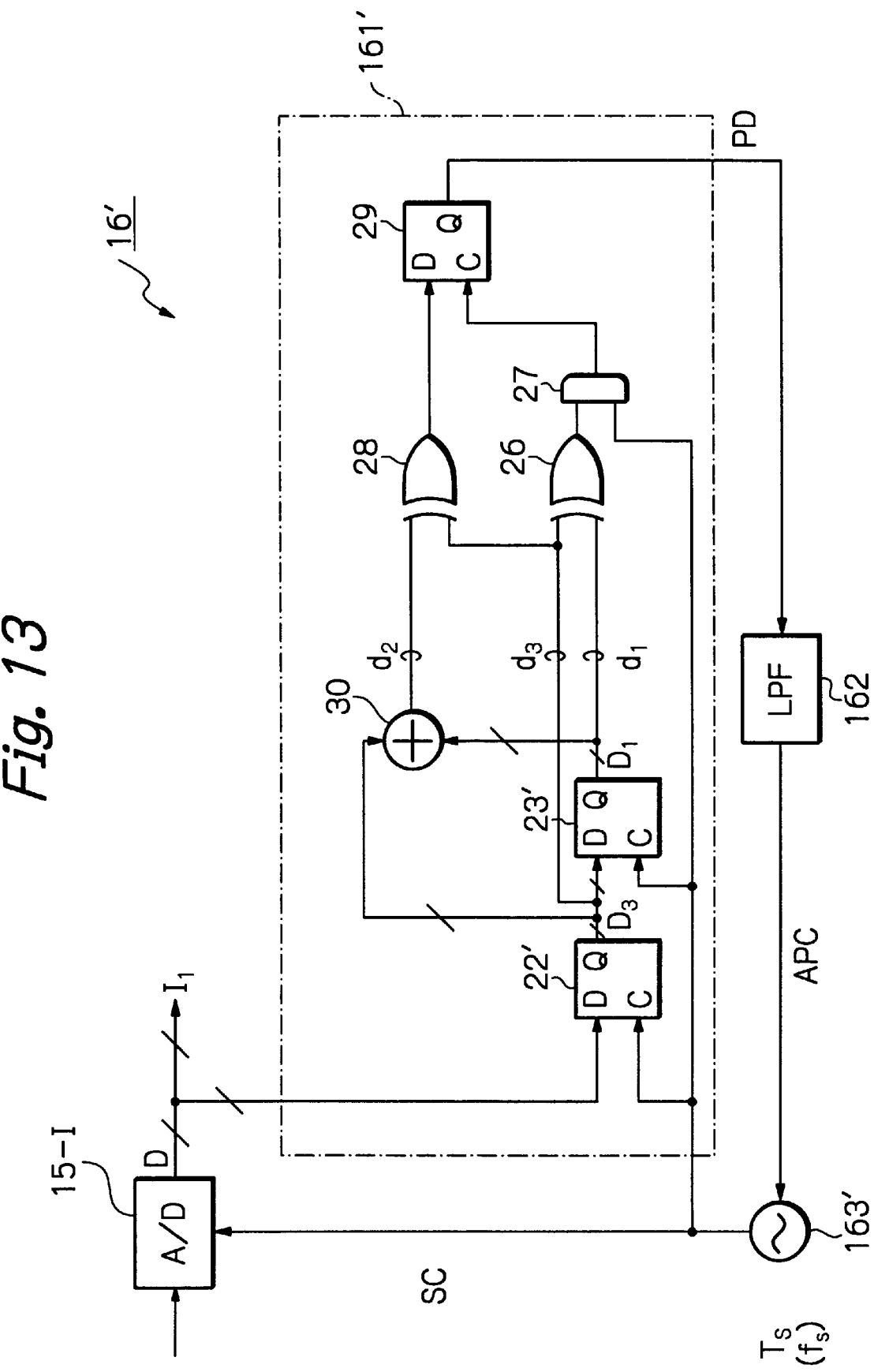
FIG. 13 is a circuit diagram illustrating a second embodiment of the clock recovery circuit according to the present invention.

In FIG. 13, which illustrates a second embodiment of the clock recovery circuit according to the present invention, the exclusive OR circuit 28 of FIG. 6 is connected to the output of the flip-flop 22', not the output of the flip-flop 23'. In this case, the high and low levels of the exclusive OR logic of the exclusive OR circuit 28 represents a leading phase and a lagging phase, respectively.

Note that the clock recovery circuit 16' of FIG. 13 can be applied to the demodulators of FIGS. 5, 11 and 12.

The present invention can be applied to an 8 ($=2^3$)–level QAM system, a 16 ($=2^4$)–level QAM system, a 32 ($=2^5$)–level QAM system, a 64 ($=2^6$)–level QAM system and the like.

As explained hereinabove, according to the present invention, since a clock recovery circuit is operated at the speed defined by the modulation frequency $f_S$ (or the symbol time period $T_S$), if the clock recovery circuit is applied to a QAM demodulator, the power consumption of A/D converters and an endless phase shifter can be reduced, as well as the reduction of the manufacturing cost.

What is claimed is:

1. A clock recovery circuit in a demodulator of a multi-level quadrature amplitude modulation (QAM) system, comprising:

an analog/digital (A/D) converter for performing an A/D conversion upon an analog baseband signal in synchronization with a sampling clock signal having a time period that is a symbol time period;

a phase detector, connected to said A/D converter, for receiving successive first and third data sampled from said A/D converter, calculating second data by addition of said first and third data, determining whether or not a signal transition formed by said first and third data crosses a zero value within a predetermined deviation, and comparing a polarity of said second data with a polarity of one of said first and third data, and generating a comparison result as a phase detection signal when said signal transition crosses said zero value;

a loop filter, connected to an output of said phase detector, for passing a low-frequency component of said phase detection signal therethrough; and a voltage controlled oscillator, connected between said loop filter and said A/D converter, for supplying said sampling clock signal to said A/D converter in accordance with an output signal of said loop filter.

2. The circuit as set forth in claim 1, wherein said signal transition is symmetrical with respect to said first and third data.

3. The circuit as set forth in claim 1, wherein said phase detector comprises:
   a first flip-flop, connected to said A/D converter and said voltage controlled oscillator, for shifting an output signal of said A/D converter in accordance with said sampling clock signal to generate said third data;
   a second flip-flop, connected to said first flip-flop and said voltage controlled oscillator, for shifting said third data in accordance with said sampling clock signal to generate said first data;
   an adder, connected to said first and second shift registers, for adding said first data to said third data, to generate said second data;
   a first comparator, connected to said first and second flip-flop, for comparing a most significant bit of said first data with a most significant bit of said third data;
   a second comparator, connected to said adder and one of said first and second flip-flop, for comparing a most significant bit of said second data with a most significant bit of the one of said first and third data; and
   a register, connected to said first and second comparators, for storing a comparison result of said second comparator in accordance with a comparison result of said first comparator to generate said phase detection signal.

4. The circuit as set forth in claim 3, further comprising a mask circuit, connected to said first comparator and said voltage controlled oscillator, for passing the comparison result of said first comparator to said register in accordance with said sampling clock signal.

5. The circuit as set forth in claim 1, wherein said analog baseband signal is coherent-detected.

6. The circuit as set forth in claim 1, wherein said analog baseband signal is quasi-coherent detected.

7. The circuit as set forth in claim 1, wherein said low-pass filter comprises a lag lead filter.

8. The circuit as set forth in claim 1, wherein said low-pass filter comprises a secondary lag lead filter and a digital/analog (D/A) converter.

9. A clock recovery circuit in a demodulator of a multilevel quadrature amplitude modulation (QAM) system, comprising:
   an analog/digital (A/D) converter for performing an A/D conversion upon an analog baseband signal in synchronization with a sampling clock signal having a time period that is a symbol time period;
   a phase detector, connected to said A/D converter, for receiving successive first and third data sampled from said A/D converter, to generate a phase detection signal;
   a loop filter, connected to an output of said phase detector, for passing a low-frequency component of said phase detection signal; and
   a voltage controlled oscillator, connected between said loop filter and said A/D converter, for supplying said sampling clock signal to said A/D converter in accordance with an output signal of said loop filter, said phase shifter comprising:
   a first flip-flop, connected to said A/D converter and said voltage controlled oscillator, for shifting an output signal of said A/D converter in accordance with said sampling clock signal to generate said third data;
   a second flip-flop, connected to said first flip-flop and said voltage controlled oscillator, for shifting said third data in accordance with said sampling clock signal to generate said first data;
   an adder, connected to said first and second flip-flops, for adding said first data to said third data and obtaining second data, to generate a most significant bit of said second data;
   a first exclusive OR circuit, connected to said first and second flip-flops, for performing an exclusive OR operation upon a most significant bit of said first data and a most significant bit of said third data to generate a first logic signal;
   a second exclusive OR circuit, connected to said adder and one of said first and second flip-flops, for performing an exclusive OR operation upon the most significant bit of said second data and a most significant bit of the one of said first and third data to generate a second logic signal; and
   a register, connected to said first and second exclusive OR circuits, for storing said second logic signal in accordance with said first logic signal to generate said phase detection signal.

10. The circuit as set forth in claim 9, further comprising a mask circuit, connected to said first exclusive OR circuit and said voltage controlled oscillator, for passing of said first logic signal to said register in accordance with said sampling clock signal.

11. The circuit as set forth in claim 9, wherein said analog baseband signal is coherent-detected.

12. The circuit as set forth in claim 9, wherein said analog baseband signal is quasi-coherent detected.

13. The circuit as set forth in claim 9, wherein said low-pass filter comprises a lag lead filter.

14. The circuit as set forth in claim 9, wherein said low-pass filter comprises a secondary lag lead filter and a digital/analog (D/A) converter.

* * * * *